United States Patent
Murillo Amaya et al.

(10) Patent No.: US 10,586,121 B2
(45) Date of Patent: Mar. 10, 2020

(54) IMAGE COMPENSATION FOR MOTORCYCLE BANKING

(71) Applicant: Gentex Corporation, Zeeland, MI (US)

(72) Inventors: Sergio E. Murillo Amaya, Naperville, IL (US); David M. Falb, Grand Rapids, MI (US); Peter A. Liken, West Olive, MI (US)

(73) Assignee: GENTEX CORPORATION, Zeeland, MI (US)

( * ) Notice: Subject to any disclaimer, the term of this patent is extended or adjusted under 35 U.S.C. 154(b) by 12 days.

(21) Appl. No.: 15/877,992

(22) Filed: Jan. 23, 2018

(65) Prior Publication Data

US 2018/0218229 A1 Aug. 2, 2018

Related U.S. Application Data

(60) Provisional application No. 62/451,161, filed on Jan. 27, 2017.

(51) Int. Cl.
*G06K 9/00* (2006.01)
*B60Q 1/08* (2006.01)
(Continued)

(52) U.S. Cl.
CPC ........ *G06K 9/00825* (2013.01); *B60Q 1/085* (2013.01); *B60Q 1/143* (2013.01); *G01C 9/00* (2013.01); *G06K 9/2054* (2013.01); *G06K 9/78* (2013.01); *B60Q 2300/05* (2013.01); *B60Q 2300/112* (2013.01); *B60Q 2300/136* (2013.01); *B60Q 2300/41* (2013.01); *B60Q 2300/42* (2013.01); *B60Y 2400/3015* (2013.01); *G01C 9/08* (2013.01); *G06K 9/3208* (2013.01); *G06K 9/6288* (2013.01)

(58) Field of Classification Search
CPC combination set(s) only.
See application file for complete search history.

(56) References Cited

U.S. PATENT DOCUMENTS

| 5,837,994 A | 11/1998 | Stam et al. |
| 5,990,469 A | 11/1999 | Bechtel et al. |

(Continued)

OTHER PUBLICATIONS

U.S. Appl. No. 60/780,655, filed Mar. 9, 2006, entitled Vehicle Rearview Assembly Including a Transflective Mirror Element and a High Intensity Display.
(Continued)

*Primary Examiner* — Zhiyu Lu
(74) *Attorney, Agent, or Firm* — Price Heneveld LLP; Bradley D. Johnson

(57) ABSTRACT

An imaging system for a vehicle is disclosed. The imaging system comprises an imager configured to capture image data in a forward directed field of view relative the vehicle and an inertial sensor configured to measure a bank angle of the vehicle. A controller is in communication with the imager and the inertial sensor. The controller is configured to receive the image data comprising an imaging area and process the image data with enhanced sensitivity in at least one processing window within the imaging area. The controller is further configured to adjust a location of the processing window within the imaging area based on the bank angle and detect an object in the processing window.

19 Claims, 7 Drawing Sheets

(51) Int. Cl.
*B60Q 1/14* (2006.01)
*G01C 9/00* (2006.01)
*G06K 9/20* (2006.01)
*G06K 9/78* (2006.01)
*G06K 9/62* (2006.01)
*G06K 9/32* (2006.01)
*G01C 9/08* (2006.01)

(56) References Cited

U.S. PATENT DOCUMENTS

| | | |
|---|---|---|
| 6,008,486 A | 12/1999 | Stam et al. |
| 6,049,171 A | 4/2000 | Stam et al. |
| 6,130,421 A | 10/2000 | Bechtel et al. |
| 6,130,448 A | 10/2000 | Bauer et al. |
| 6,403,942 B1 | 6/2002 | Stam |
| 6,465,963 B1 | 10/2002 | Turnbull et al. |
| 6,489,898 B1 * | 12/2002 | Nicholls ............ G01O 23/00 340/974 |
| 6,587,573 B1 | 7/2003 | Stam et al. |
| 6,611,610 B1 | 8/2003 | Stam et al. |
| 6,621,616 B1 | 9/2003 | Bauer et al. |
| 6,631,316 B2 | 10/2003 | Stam et al. |
| 6,774,988 B2 | 8/2004 | Stam et al. |
| 6,861,809 B2 | 3/2005 | Stam |
| 8,045,760 B2 | 10/2011 | Stam et al. |
| 8,289,430 B2 | 10/2012 | Bechtel et al. |
| 8,305,471 B2 | 11/2012 | Bechtel et al. |
| 8,339,526 B2 | 12/2012 | Minikey, Jr. et al. |
| 8,587,706 B2 | 11/2013 | Bechtel et al. |
| 8,629,927 B2 | 1/2014 | Bechtel et al. |
| 2009/0010494 A1 * | 1/2009 | Bechtel ............ B60Q 1/1423 382/104 |
| 2009/0096937 A1 | 4/2009 | Bauer et al. |
| 2010/0194602 A1 * | 8/2010 | Engels ............ G01O 23/00 340/979 |
| 2014/0091989 A1 | 4/2014 | Szczerba et al. |
| 2015/0244920 A1 * | 8/2015 | Akiba ............ H04N 5/2353 348/362 |
| 2016/0034770 A1 | 2/2016 | Peterson et al. |
| 2016/0200421 A1 * | 7/2016 | Morrison ............ B64O 13/18 244/17.23 |
| 2017/0003134 A1 | 1/2017 | Kim et al. |
| 2017/0076606 A1 * | 3/2017 | Gupta ............ G08G 1/167 |
| 2017/0162055 A1 * | 6/2017 | Lehner ............ B60W 30/0956 |
| 2017/0225619 A1 * | 8/2017 | Torii ............ B60R 1/00 |

OTHER PUBLICATIONS

U.S. Appl. No. 60/804,351, filed Jun. 9, 2006, entitled Vehicle Rearview Assembly Including a Transflective Mirror Element and High Intensity Display.

U.S. Appl. No. 60/900,588, filed Feb. 9, 2007, entitled Improved Image Sensor.

U.S. Appl. No. 60/902,728, filed Feb. 22, 2007, entitled Image Sensor.

U.S. Appl. No. 61/008,762, filed Dec. 21, 2007, entitled Improved Imaging Device.

Federal Institute of Industrial Property, "Notification of Transmittal of the International Search Report and the Written Opinion of the International Searching Authority" (Jun. 21, 2018) (9 pages).

* cited by examiner

IMAGE COMPENSATION FOR MOTORCYCLE BANKING

CROSS-REFERENCE TO RELATED APPLICATION

This application claims priority to and the benefit under 35 U.S.C. § 119(e) of U.S. Provisional Patent Application No. 62/451,161, filed on Jan. 27, 2017, entitled "IMAGE COMPENSATION FOR MOTORCYCLE BANKING," the entire disclosure of which is hereby incorporated herein by reference.

TECHNOLOGICAL FIELD

The present disclosure relates generally to an image detection system and more particularly relates to an image detection system for a motorcycle.

SUMMARY

In one aspect of the disclosure, an imaging system for a vehicle is disclosed. The imaging system comprises an imager configured to capture image data in a forward directed field of view relative to the vehicle and an inertial sensor configured to measure a bank angle of the vehicle. A controller is in communication with the imager and the inertial sensor. The controller is configured to receive the image data comprising an imaging area and process the image data in at least one processing window within the imaging area. The processing window provides enhanced sensitivity for detection of objects, such as, vehicle headlights and tail lights. The controller is further configured to adjust a location of the processing window within the imaging area to move the enhanced sensitivity based on the bank angle and detect an object in the processing window.

In another aspect of the disclosure, a method for processing image data in an imaging system is disclosed. The method comprises capturing image data in a forward directed field of view relative to the vehicle and measuring a bank angle of the vehicle. The method continues by processing the image data in an imaging area. The image data in at least one processing window is processed with a higher sensitivity than the image data in a remaining portion of the imaging area. The method further comprises adjusting a location of the processing window within the imaging area based on the bank angle and detecting an object in the processing window. In response to detecting the object, the method continues by generating a detection signal.

In yet another aspect of the disclosure, an imaging system for a vehicle configured to form a bank angle relative to a gravity during a turning operation is disclosed. The system comprises an imager configured to capture image data in a forward directed field of view relative to the vehicle. The system further comprises an inertial sensor configured to measure the bank angle. A controller is in communication with the imager and the inertial sensor. The controller is configured to receive the image data comprising an imaging area and process the image data in at least one processing window within the imaging area. The controller is further configured to adjust a location of the processing window within the imaging area based on the bank angle and detect an object in the processing window. In response to detecting the object, the controller is configured to generate a detection signal. In response to receiving the detection, a light control module is configured to adjust an illumination pattern of a headlamp of the vehicle.

These and other features, advantages, and objects of the present device will be further understood and appreciated by those skilled in the art upon studying the following specification, claims, and appended drawings.

BRIEF DESCRIPTION OF THE DRAWINGS

The invention will now be described with reference to the following drawings, in which.

DETAILED DESCRIPTION OF EMBODIMENTS

Figure 1:
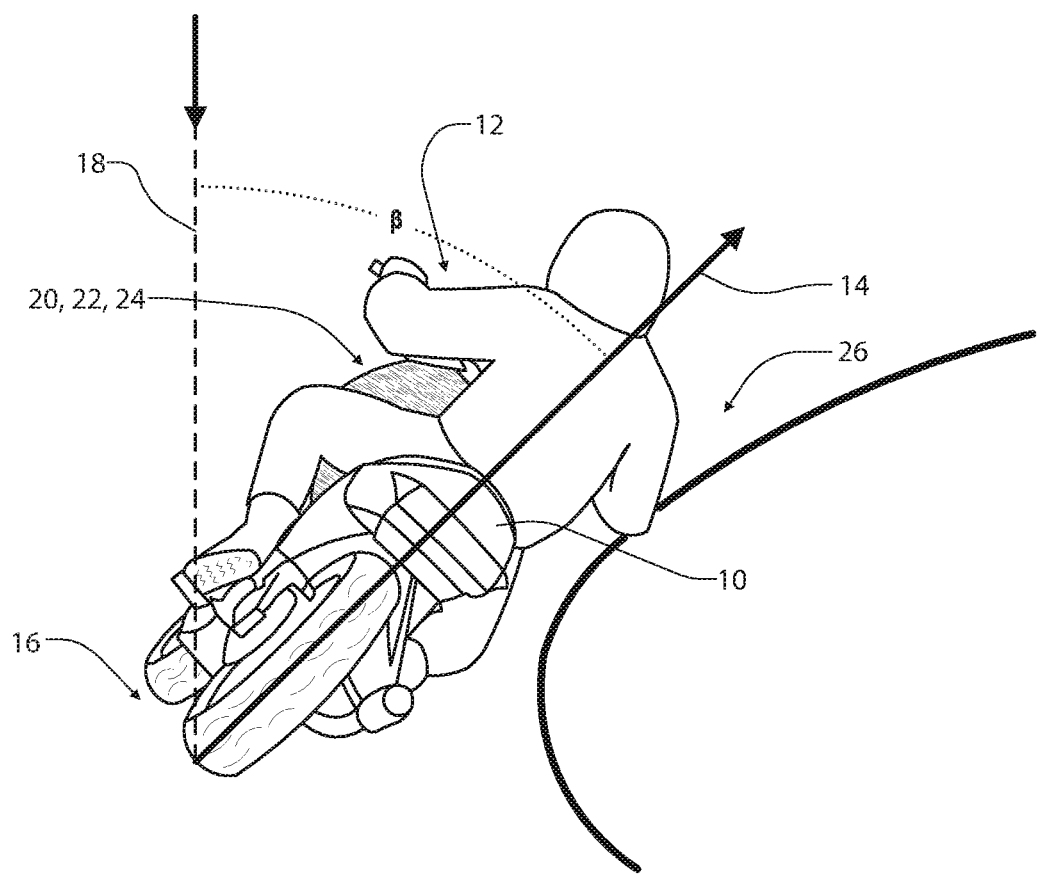
FIG. 1 is a projected view of a vehicle demonstrating a turning operation.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a projected view of a vehicle 10 performing a turning operation is shown. The vehicle 10 may comprise an imaging system 12 configured to identify one or more objects or features in a forward path of the vehicle 10. In some embodiments, the imaging system 12 may provide a driver assist function (e.g. automatic headlamp control, lane departure warning, etc.). The vehicle 10 may correspond to a motorized, two-wheeled vehicle (e.g. a motorcycle, scooter, moped) or any other form of vehicle similar to those discussed herein. In general, the vehicle 10 may correspond to a vehicle capable of achieving a bank angle β while undergoing a turning operation. The bank angle β may correspond to a rotation of the vehicle 10 indicated by reference arrow 14 relative to a contact surface 16. The bank angle β may indicate a magnitude and direction of a leaning angle of the vehicle 10 about a forward direction vector measured relative to a gravitational force direction 18.

The imaging system 12 may be configured to capture image data in a forward directed field of view relative to the vehicle 10. The imaging system 12 may comprise an imager 20 and an inertial sensor 22 in communication with a controller 24. In this configuration, the imaging system 12 may be operable to receive the image data from the imager 20 and detect at least one object or feature in the forward direct field of view. Additionally, in some embodiments, the controller 24 may be configured to monitor the bank angle β with the inertial sensor 22 to adjust a processing window allowing increased sensitivity in the direction of the bank angle β in which the at least one object may be detected. Various examples of processing windows are discussed in reference to FIGS. 2-5.

In various embodiments, the imaging system 12 may be configured to detect a variety of objects in the image data of the forward directed field of view. For example, the controller 24 may be operable to detect a headlamp of an oncoming vehicle and a tail lamp of a leading vehicle. Additionally, the controller 24 may be operable to identify a variety of features that may be encountered on a roadway 26. Such features may comprise a lane line, road sign, horizon, a vehicle, pedestrian, road hazard, and various additional features that may be encountered proximate the roadway 26.

The controller 24 may apply the bank angle β to improve the detection of features proximate the roadway 26. For example, in some embodiments, the controller 24 may process the image data received from the imager 20 in at least one processing window to identify at least one of a headlamp of an oncoming vehicle and tail lamp of a leading vehicle. However, due to the nature of the bank angle β as it applies to turning operations of the vehicle 10, the headlamp or tail lamp may widely vary in location within an imaging area of the forward directed field of view. Accordingly, the controller 24 may utilize the bank angle β from inertial data communicated from the inertial sensor 22 to adjust the processing window within the imaging area to enhance the sensitivity in an expected region of the headlamp or tail lamp. As demonstrated in various examples discussed herein, the controller 24 may apply the bank angle β to adjust the at least one processing window in a variety of ways to improve the detection of at least one object in the image data captured by the imager 20.

In some embodiments, the image data in the processing windows may be analyzed by the controller 24 with a different sensitivity than the image data outside the processing windows. For example, in some embodiments, the system 12 may be configured to detect headlamps and tail lamps of vehicles along the forward path of the vehicle 10. In such embodiments, the processing windows may be configured to detect light sources in the image data at an increased sensitivity. The sensitivity may be controlled by the controller 24 by processing the image data in the processing windows at a low gain or level of gain that is lower than the remaining portions of the image data. In this way, the controller 24 may adjust a position of the processing windows in a field of view of the imager thereby adjusting a detection sensitivity in one or more of the processing windows to improve a detection of light sources (e.g. headlamps and tail lamps).

Figure 2:
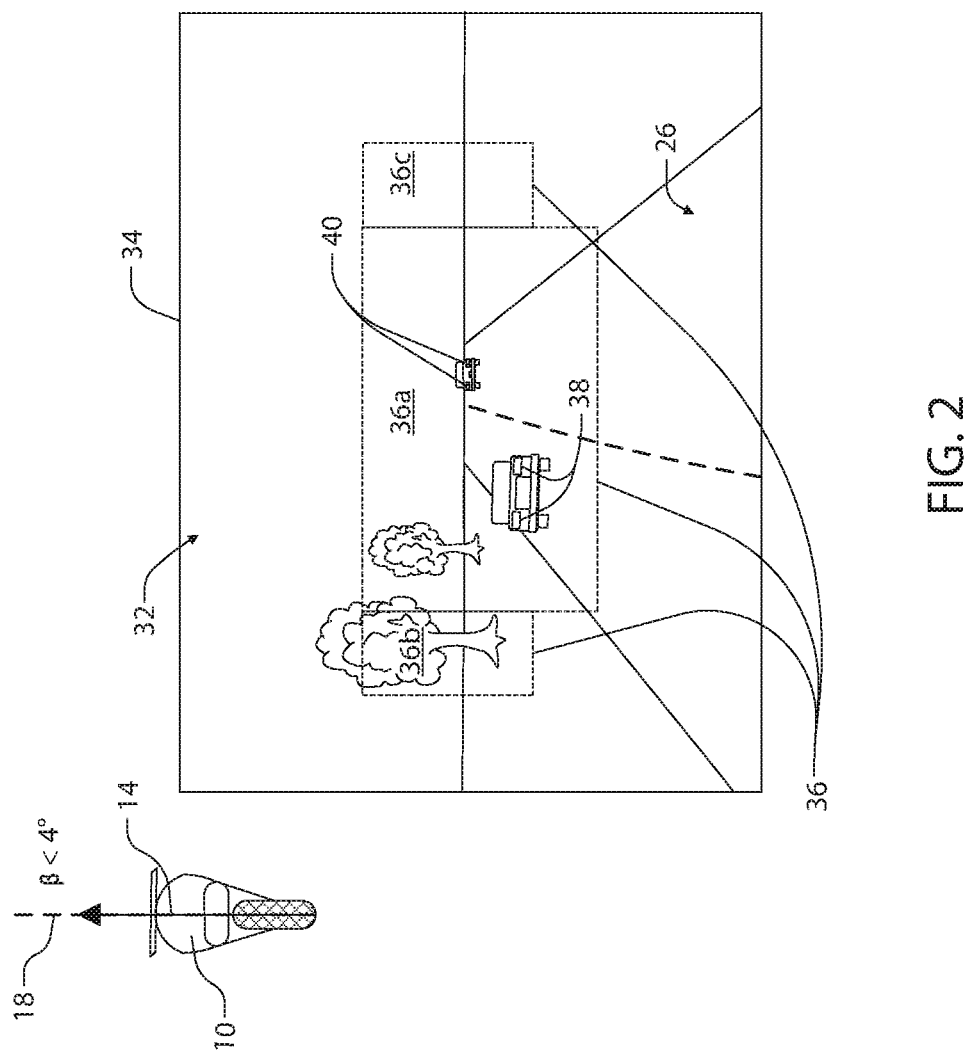
FIG. 2 is a schematic diagram of a field of view captured by an imager of an imaging system demonstrating at least one processing window.

Referring to FIG. 2, a schematic diagram of a field of view 32 captured by the imager 20 is shown demonstrating the vehicle 10 at a bank angle β of approximately less than 4°. In the exemplary embodiment of FIG. 2, the controller 24 is configured to process the image data of the imaging area 34 in a plurality of processing windows 36. For example, the plurality of processing windows 36 may comprise a first processing window 36a, a second processing window 36b, and a third processing window 36c. In this configuration, the controller 24 may process the image data in the processing windows 36 with a low gain or increased sensitivity than the image data outside the processing windows 36 to detect an upcoming vehicle. In this way, the controller 24 may be configured to identify light sources with improved accuracy and sensitivity. As discussed herein, light sources may be in the form of at least one headlamp 38, a tail lamp 40, one or more indicator lights, or other objects that may correspond to vehicles.

As discussed previously, the imaging system 12 may receive information indicating the bank angle β of the vehicle 10 and apply the bank angle β to adjust a location of a processing window (e.g. processing windows 36). As depicted in FIG. 2, the vehicle 10 is operating substantially perpendicular to the roadway surface 26. In this configuration, the bank angle β of the vehicle 10 is relatively small. Under such conditions, the controller 24 may identify that the bank angle β is below a first predetermined threshold (e.g. β<4°). Accordingly, based on the bank angle β, the controller 24 may position one or more of the processing windows 36 centrally or approximately in the center of the imaging area 34. In this way, the controller 24 may control the position of the processing windows 36 to be located centrally in the imaging area 34 in response to the vehicle 10 having a bank angle β less than the first predetermined threshold.

Figure 3:
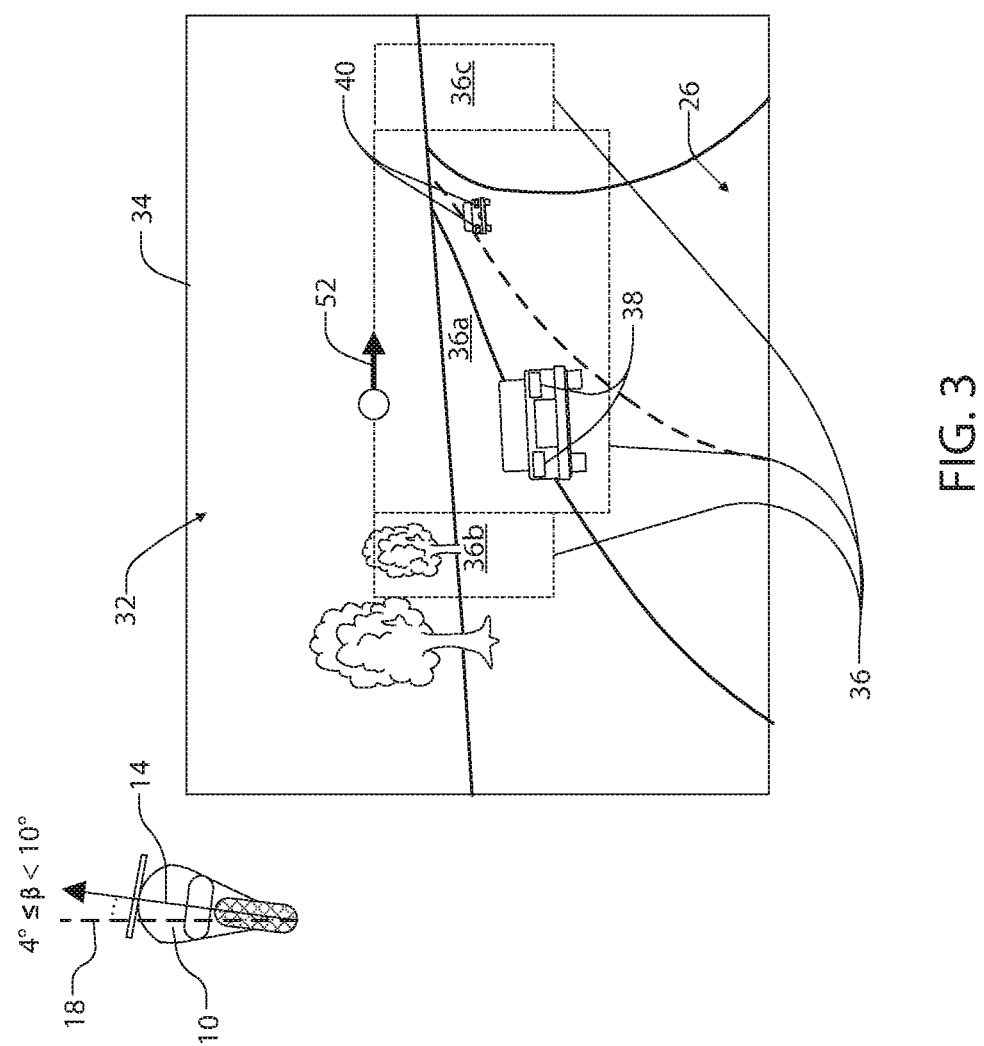
FIG. 3 is a schematic diagram of a field of view captured by an imager of an imaging system demonstrating at least one processing window.
Figure 4:
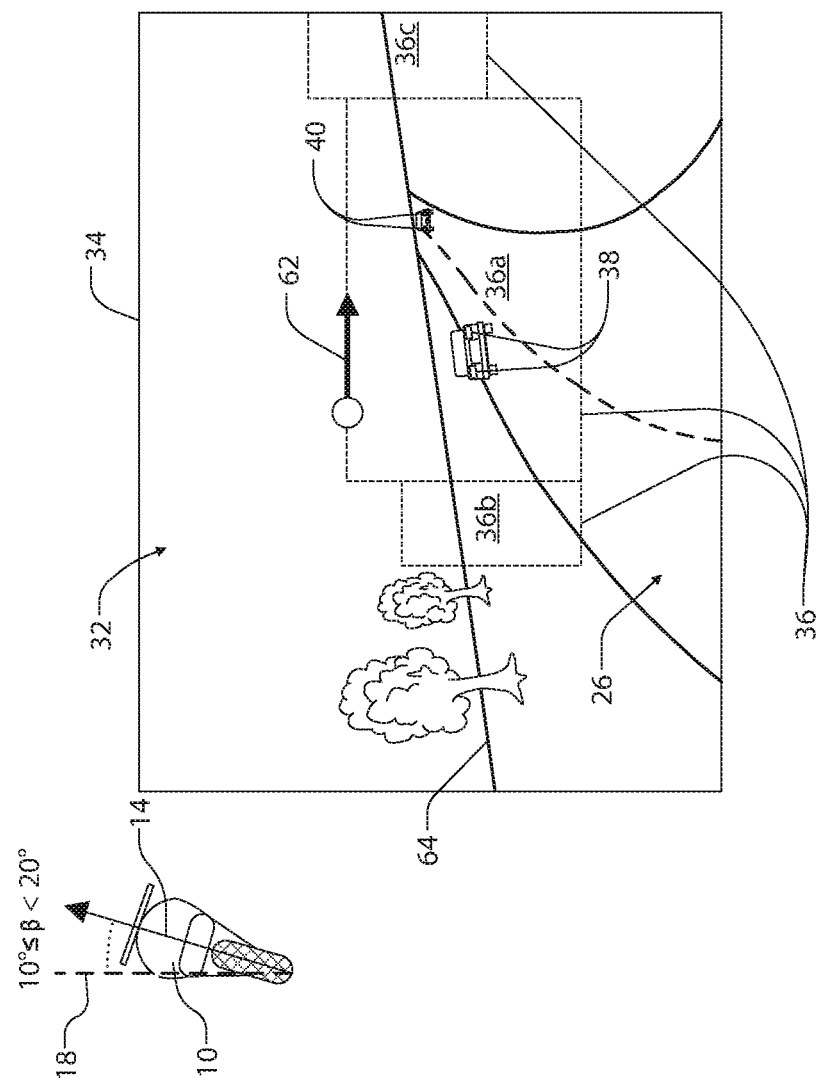
FIG. 4 is a schematic diagram of a field of view captured by an imager of an imaging system demonstrating at least one processing window.
Figure 5:
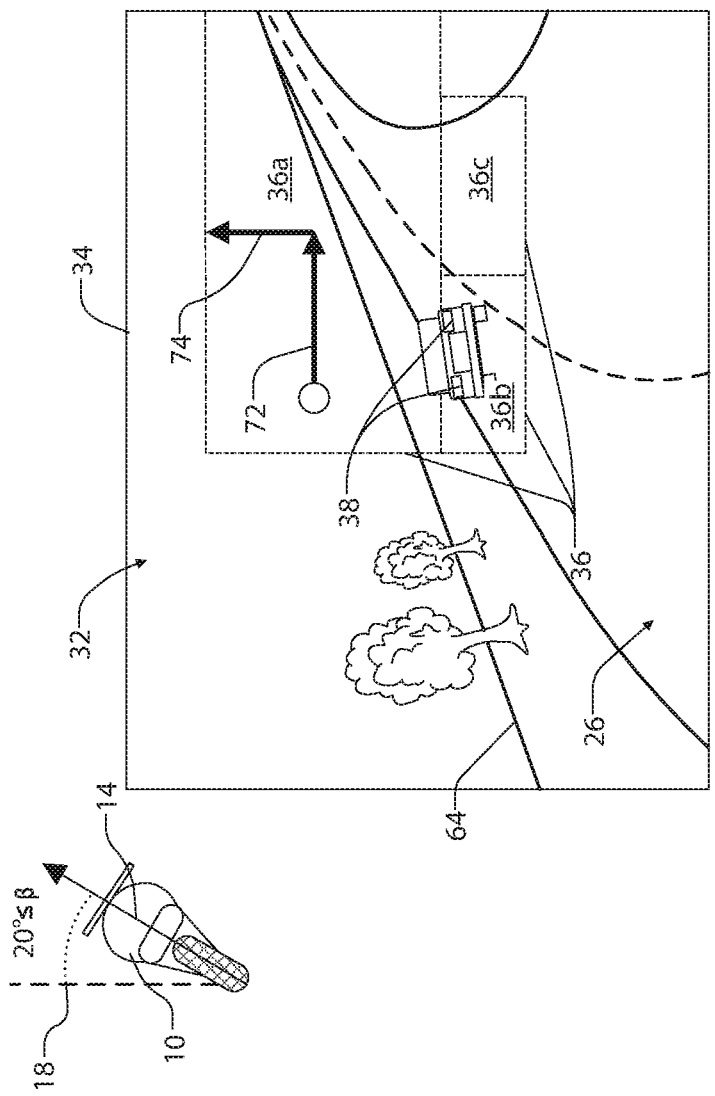
FIG. 5 is a schematic diagram of a field of view captured by an imager of an imaging system demonstrating at least one processing window.

Referring now to FIGS. 3-5, additional schematic diagrams demonstrating the field of view 32 of the imager 20 are shown corresponding to the vehicle 10 operating at various bank angles. According to the bank angle β identified by the inertial sensor 22, the controller 24 may be configured to adjust the position of one or more of the processing windows 36 within the imaging area 34. For example, as demonstrated in FIG. 3, the processing windows 36 are shown adjusted horizontally within the imaging area 34 in response to the bank angle β exceeding the first predetermined threshold (e.g. β>4°). In response to the bank angle β exceeding the first predetermined threshold, the controller 24 may adjust one or more of the plurality of processing windows 36 in the direction of the bank angle β. A reference arrow 52 is shown in FIG. 3 demonstrating the relative change in location of the processing windows 36 in response to the bank angle β exceeding the first predetermined threshold.

In some embodiments, the controller 24 may be configured to adjust the position of the processing windows 36 proportionally to the bank angle β. For example, once the bank angle is β identified exceeding the first predetermined threshold, the controller may proportionally adjust the location of the processing windows 36 in the direction of the bank angle β. Adjusting the location of the processing windows 36 may account for an expected change in a path of the roadway 26 based on the bank angle β. In this way, the controller 24 may adjust the location of at least one processing window in the imaging area to move proportionally to the bank angle β.

By adjusting the location of one or more of the processing windows 36, the controller 24 may anticipate and adjust a location of the plurality of processing windows 36 to provide an enhanced sensitivity for the detection of bright or contrasting pixels in portions of the image data. The enhanced sensitivity may be achieved by applying a lower gain or exposure time when processing the image data in the processing windows 36 than the image data outside the processing windows 36. For example, when detecting light sources or objects having a high contrast during nighttime or low light conditions, a high gain level or lengthy exposure time may limit a discernability of the light sources due to overexposure. Accordingly, by applying a comparably lower gain setting or exposure to the image data in the processing windows 36, the controller 24 may preserve the integrity of the bright pixels corresponding to light sources in the processing windows 36 while capturing the image data outside the processing windows 36 with a higher gain or exposure setting. In this way, the controller 24 may improve a detection of light sources in the image data by focusing the processing windows 36 on the roadway 26 ahead in the field of view 32.

As the bank angle β increases above the first predetermined threshold, the controller 24 may continue to proportionally adjust the location of the plurality of processing windows 36 in the imaging area 34. For example, the controller may adjust the location of the processing windows 36 horizontally in the imaging area 34 until the bank angle β exceeds a second predetermined threshold. The second predetermined threshold is further discussed in reference to FIG. 4. As discussed herein, the imaging system 12 may provide for a variety of methods configured to adjust the position of at least one processing window 36 or detection region by predicting a curve in the roadway 26 based on the bank angle β.

FIG. 4 demonstrates the field of view 32 corresponding to the vehicle 10 operating at the bank angle β exceeding the second predetermined threshold (e.g. β>10°). As demonstrated in FIG. 4, upon reaching the second predetermined threshold, the plurality of processing windows may be proportionally adjusted to a horizontal extreme of the imaging area 34. Reference arrow 62 demonstrates the relative change in position of the plurality of processing windows 36 in reference to the location demonstrated in FIG. 2. Once the bank angle β exceeds the second predetermined threshold, the controller 24 may reposition one or more of the processing windows 36 relative to each other. In this way, the controller 24 may be configured to adjust a position of the windows 36 relative to one another such that the processing windows 36 are positioned based on a predicted location of the roadway, which may correspond to a horizon 64.

For example, in some embodiments, the first processing window 36a may correspond to a central processing window. The second processing window 36b and a third processing window 36c may correspond to auxiliary processing windows arranged horizontally adjacent to the central processing window 36a. The auxiliary processing windows 36b, 36c may be adjusted vertically in position relative to the first processing window 36a. Accordingly, in response to the bank angle β exceeding the second predetermined threshold, the controller 24 may proportionally adjust the location of each of the auxiliary processing windows 36b, 36c, relative to the bank angle β.

In the specific embodiment demonstrated in FIG. 4, the second processing window 36b is adjusted downward relative to the first processing window 36a and proportionate to the bank angle β. Additionally, the third processing window 36c is adjusted upward relative to the first processing window 36a and proportionate to the bank angle β. In this configuration, the controller 24 may adjust the position of each of the processing windows 36 to accommodate for an increasing bank angle β indicating an increasing curvature in the roadway 26. By adjusting the position of the processing windows 36 based on the bank angle β, the controller may improve a sensitivity of a detection of light sources. For example, the sensitivity may be improved by limiting a gain or adjusting one or more exposure settings in the processing windows 36 relative to the remaining image data. In this way, the controller 24 may provide for enhanced detection of objects proximate the roadway 26 by anticipating a location of the roadway 26. The adjustment of the processing windows 36 may also provide for the imaging system 12 to focus detection along the horizon 64 captured in the field of view 32.

In FIG. 5, the field of view 32 is demonstrated for the vehicle 10 operating at a bank angle exceeding a third predetermined threshold (e.g. β≥20°). In response to the bank angle β exceeding the third predetermined threshold, the controller 24 may further relocate the auxiliary processing windows 36b, 36c relative to the central or first processing window 36a. As demonstrated in FIG. 5, the auxiliary processing windows 36b, 36c are transposed or rotated 90° and repositioned below the central or first processing window 36a. Additionally, the position of the plurality of processing windows 36 may be adjusted vertically or upward within the imaging area 34 proportionally to the bank angle β. Reference arrow 72 demonstrates a horizontal shift of the first processing window 36a and reference arrow 74 demonstrates a vertical shift of the first processing window 36a in the imaging area 34.

As demonstrated in FIG. 5, the auxiliary processing windows 36b, 36c may be repositioned relative to the central or first processing window 36a in response to the bank angle β exceeding the third predetermined threshold. Additionally, the controller 24 may proportionally reposition the plurality of processing windows 36 vertically as demonstrated by reference arrow 74 as the bank angle β increases beyond the third predetermined threshold. Accordingly, the controller 24 may be operable to adjust the location of one or more of the processing windows 36 in a variety of ways to improve the detection capability and efficiency of the imaging system 12 based on the bank angle β. In this way, the imaging system 12 may anticipate a changing location of the roadway 26 in the field of view 32 to enhance the sensitivity to detect an object or light source in the image data.

Figure 6:
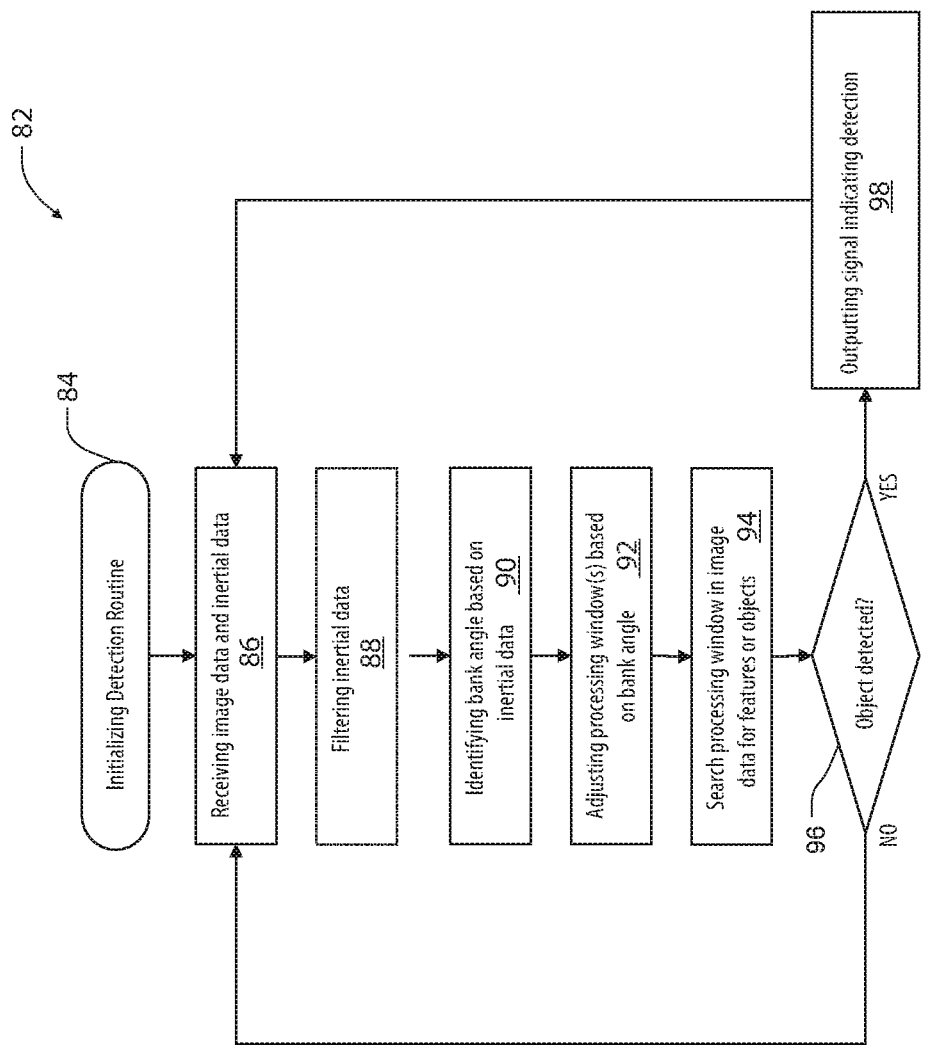
FIG. 6 is a flow chart demonstrating a detection routine for an imaging system.

Referring now to FIG. 6, a flow chart of a method 82 for object detection is shown. The method may begin by the controller 24 initializing a detection routine (84). Once initialized, the controller 24 may begin receiving image data from the imager 20 and inertial data from the inertial sensor 22 (86). In some embodiments, the inertial data may further be filtered by the controller 24 in step 88. Filtering the data utilized to identify the bank angle β may be of particular importance when implementing specific types of inertial sensors. For example, specific filtering may be required to accurately identify the bank angle β if the inertial sensor 22 corresponds to a gyroscope utilized alone without additional sensors (e.g. accelerometers, etc.).

From the inertial data, the controller 24 may continue by identifying the bank angle β (90). With the bank angle β, the controller may adjust a location, orientation, proportion, or various other aspects of the processing windows 36 based on the bank angle β (92). The adjusted processing windows 36 may then be applied by the controller 24 in step 94 to search for one or more objects in the processing windows 36. Objects detected in the imaging area may comprise various objects or features. For example, the controller 24 may be operable to detect a headlamp of an oncoming vehicle and a tail lamp of a leading vehicle. Additionally, the controller 24 may be operable to identify a variety of features that may be encountered on a roadway 26.

In step 96, the controller 24 may determine if an object is detected in the processing windows 36. If an object is not detected in step 96, the controller may return to step 86 and receive additional image data and inertial data. If the object is detected in step 96, the controller may continue to step 98 and output a signal indicating the detection. The signal may be output to a variety of controls or modules for the vehicle 10. In an exemplary embodiment, the signal indicating the detection in step 98 may be output to a light or headlamp control module of the vehicle 10. In response to receiving the signal, the headlamp control module may be configured to adjust an illumination (high beam, low beam, light distribution, light direction) of a headlamp of the vehicle 10. Following outputting the signal indicating the detection in step 98, the controller 24 may again return to step 86.

Figure 7:
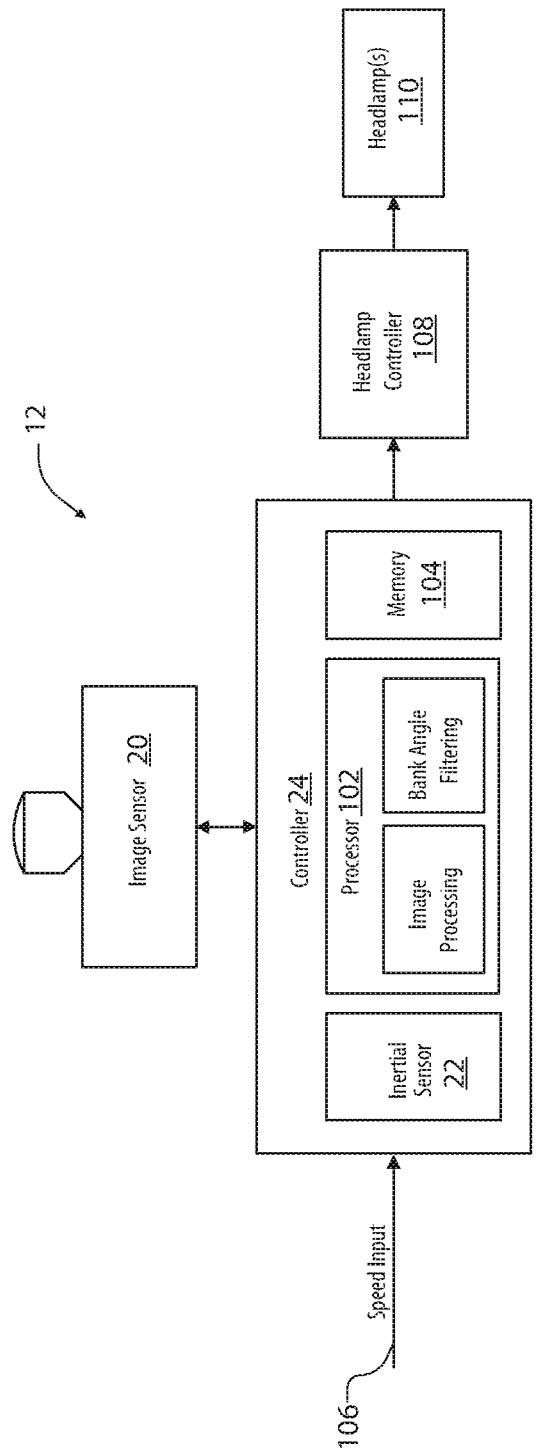
FIG. 7 is a block diagram of an imaging system in accordance with the disclosure.

Referring to FIG. 7, a block diagram of the controller 24 is shown. The controller 24 may comprise a processor 102 in electrical communication with the imager 20. The processor 102 may be configured to receive image data of the imaging area 34 from the imager 20. The processor 102 may further be configured to process images corresponding to the image data to detect the at least one object or characteristic. The processor may be in communication with a memory 104 configured to process the image data and inertial data as discussed herein. The processor 102 may be implemented using a microcontroller, a microprocessor, a digital signal processor, a programmable logic unit, a discrete circuitry, or any combination thereof. Additionally, the microcontroller may be implemented using more than one microprocessor.

In some embodiments, the processor 102 may process or analyze the image data in one or more of the processing windows 36 at a different sensitivity than portions of the image data outside the processing windows 36. The sensitivity or image processing settings (e.g. gain, exposure, scanning time, scanning frequency, detection or classification threshold, etc.) may be processed in the processing windows 36 at different settings or rates than regions of the image data outside the processing windows 36. For example, the processor 102 may process the image data in processing windows 36 at a first gain setting and process the image data outside the processing windows 36 at a second gain setting. The first gain setting may be lower than the second gain setting, such that the processor 102 may detect light sources with an improved accuracy or sensitivity in the processing windows 36. In this way, the controller 24 may tune one or more settings of the processor 102 to process the image data in the processing windows 36 with an increased sensitivity for the detection of light sources or other objects that may be of interest.

The controller 24 is shown in communication with the inertial sensor 22 and the imager 20. The inertial sensor 22 may correspond to a 3-axis accelerometer, a gyroscope, an Inertial Measurement Unit (IMU), and various other devices operable to measure the bank angle β. In some specific embodiments, the inertial sensor 22 may correspond to a gyroscope without additional inertial measurement devices. In such embodiments, specific filtering may be necessary to accurately identify the bank angle β throughout operation of the vehicle 10. For example, inertial data from the gyroscope when operating without additional inertial monitoring devices may be filtered by an iterative process called adaptive filtering for bias estimation. Such filtering may be based on a least mean squares (LMS) algorithm to estimate and remove the bias from the inertial data. In this way, the controller 24 may generate bias compensated values of the bank angle β. Accordingly, the disclosure may provide for independent estimation of the bank angle β of the vehicle 10 with inertial data derived only from a gyroscope to achieve an efficient hardware configuration for the system 12.

For example, in some embodiments, the inertial data may contain signal noise and error from a variety of sources. As previously discussed, inertial data from the gyroscope may be prone to a bias error or drift component. If not filtered or offset to account for the bias, the inertial data may not accurately identify the vehicle's angular velocity and consequently may not accurately identify the bank angle β. Additionally, the inertial data may include white noise and noise attributed to engine vibration. These components of the inertial data may further be filtered by the controller 24 from the inertial data to ensure an accurate determination of the bank angle β.

The white noise, the bias error, and the engine vibration noise of the inertial data may be filtered by the controller 24 by processing the inertial data through a finite impulse response filter or a moving average filter and an iterative adaptive filter. Such filtering processes may be configured to remove noise associated with changing conditions of operation of the vehicle 10. In some embodiments, the controller 10 may be configured to identify a speed or operating velocity of the vehicle 10. For example, the controller 10 may be in communication with a speed sensor of the vehicle 10. In such embodiments, the controller 24 may filter the inertial data with a running average filter during operation of the vehicle 10. Additionally, the iterative adaptive filter may be updated in response to the operating speed of the vehicle 10 decreasing below 5 kph. Accordingly, the controller 10 may be configured to filter the inertial data through a variety of filter methods and processes, some of which may be imperative to utilizing the gyroscope to independently identify the inertial data configured to determine the bank angle β.

The imager 20 may be of a variety of types, such as a light sensor or image sensor, configured to detect objects in the field of view 32, which may correspond to light emitted from a light source on the roadway 26. The imager 20 may correspond to various forms of image or light sensors, for example a charge-coupled device (CCD) or complementary metal-oxide-semiconductor (CMOS). The imager 20 may correspond to the imager disclosed in the SMART BEAM lighting control system manufactured by Gentex Corporation described in commonly assigned U.S. Provisional Patent Application Nos. 60/900,588, 60/902,728, and 61/008, 762; U.S. Pat. Nos. 8,289,430, 8,305,471, 8,587,706, and 8,629,927, the disclosures of each of the above are incorporated in their entireties herein by reference. Further, detailed descriptions of automatic vehicle exterior light control systems are described in commonly assigned U.S. Pat. Nos. 5,837,994, 5,990,469, 6,008,486, 6,130,448, 6,130,421, 6,049,171, 6,465,963, 6,403,942, 6,587,573, 6,611,610, 6,621,616, 6,631,316, 6,774,988, 6,861,809 and 8,045,760; and U.S. Provisional Patent Application Nos. 60/404,879, and 60/394,583, the disclosures of which are also incorporated herein in their entireties by reference. Also, commonly assigned U.S. Provisional Application Nos. 60/780,655 and 60/804,351; U.S. Pat. No. 8,339,526; and U.S. Patent Application Publication No. 2009/0096937 describe various displays for use with the present disclosure, the entire disclosures of each of these applications are also incorporated herein by reference.

A speed input 106 may be utilized to provide speed information of the vehicle 10 to the controller 24. The speed input 106 may be utilized by the controller 24 in addition to the image data received from the imager 20 to identify and discern among non-target objects and target objects or target vehicles. In response to the detection of one or more objects (e.g. the headlamp 38 or tail lamp 40), the controller 24 may be configured to control a headlamp controller 108. The headlamp controller 108 may be configured to control low beam headlamps and high beam headlamps of the vehicle 10. In some embodiments, the headlamp controller 108 may be configured to control a distribution, orientation, or other lighting configurations of one or more headlamps 110 or other light sources of the vehicle 10.

In some embodiments, the controller 24 may be configured to output signals to various vehicle systems, for example driver assist systems to identify a detection of at least one object or feature of interest in the field of view 32. In this manner, controller 24 is operable to control the various vehicle systems to improve vehicle operation. At least one implementation of a headlight control system is taught in U.S. Pat. No. 6,049,171, entitled "CONTINUOUSLY VARIABLE HEADLAMP CONTROL," filed by Joseph Stam et al. on Sep. 18, 1998, the disclosure of which is incorporated herein by reference.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. An imaging system for a vehicle comprising:
    an imager configured to capture image data in a forward directed field of view relative to the vehicle;
    an inertial sensor configured to measure the bank angle, wherein the bank angle comprises an angle of the vehicle relative to an operating surface; and
    a controller in communication with the imager and the inertial sensor, wherein the controller is configured to:
        receive the image data comprising an imaging area;
        process the image data in a plurality of processing windows within the imaging area;
        adjust a location and distribution of the processing windows within the imaging area based on the bank angle;
        detect an object in the processing window; and
        generate a detection signal in response to detecting the object.

2. The system according to claim 1, wherein the object corresponds to at least one of a headlamp of an oncoming vehicle and a tail lamp of a leading vehicle.

3. The system according to claim 1, further comprising:
    a light control module configured to adjust an illumination pattern of a headlamp of the vehicle.

4. The system according to claim 1, wherein the processing windows of the plurality of processing windows are arranged in different regions of the imaging area.

5. The system according to claim 4, wherein the controller is further configured to:
    adjust a horizontal location and a vertical location of each of the processing windows based on the bank angle.

6. The system according to claim 4, wherein the location of the processing windows is determined based on a plurality of positioning algorithms applied based on the bank angle.

7. The system according to claim 4, wherein the controller is further configured to:
    adjust a horizontal location of the processing windows in response to the bank angle exceeding a first threshold.

8. The system according to claim 7, wherein the controller is further configured to:
    adjust a vertical location of a first processing window relative to a second processing window of the plurality of processing windows in response to the bank angle exceeding a second threshold.

9. A method for processing image data in an imaging system, the method comprising:
    capturing image data in a forward directed field of view relative to the vehicle;
    measuring a bank angle of the vehicle;
    processing the image data in an imaging area, wherein the image data in a plurality of processing windows is processed with a higher sensitivity than the image data in a remaining portion of the imaging area, wherein the higher sensitivity comprises a reduced gain than the image data in a remaining portion of the imaging area;
    adjusting a position of the processing windows relative to each other within the imaging area based on the bank angle, wherein the bank angle comprises an angle of the vehicle relative to an operating surface of the vehicle;
    detecting an object in the processing window; and
    generating a detection signal in response to detecting the object.

10. The method according to claim 9, wherein the higher sensitivity is configured to detect a light source in the image data.

11. The method according to claim 10, wherein the light source is at least one of a headlamp of an oncoming vehicle and a tail lamp of a leading vehicle.

12. The method according to claim 9, further comprising:
    adjusting an illumination pattern of a headlamp of the vehicle in response to the detection signal.

13. The method according to claim 10, wherein the plurality of processing windows are arranged in different regions of the imaging area.

14. The method according to claim 13, further comprising:
    adjusting a horizontal location and a vertical location of one or more of the processing windows based on the bank angle.

15. An imaging system for a vehicle configured to form a bank angle relative to gravity during a turning operation, the system comprising:
    an imager configured to capture image data in a forward directed field of view relative to the vehicle;
    an inertial sensor configured to measure the bank angle of the vehicle relative to an operating surface on which the vehicle is operating;
    a controller in communication with the imager and the inertial sensor, wherein the controller is configured to:
        receive the image data comprising an imaging area;
        process the image data in a plurality of processing windows within the imaging area;
        adjust a distribution of the processing windows within the imaging area based on the bank angle;
        detect an object in at least one of the processing windows; and generate a detection signal in response to detecting the object; and a light control module configured to adjust an illumination pattern of a headlamp of the vehicle in response to the detection signal.

16. The system according to claim 15, wherein the image data in the in at least one of the processing windows is processed with a higher sensitivity than the image data in a remaining portion of the imaging area.

17. The system according to claim 15, wherein the higher sensitivity comprises a reduced gain configured to detect a light source in the image data.

18. The system according to claim 15, wherein the object corresponds to at least one of a headlamp of an oncoming vehicle and a tail lamp of a leading vehicle.

19. The system according to claim 15, wherein the image data in a first processing window of the plurality of processing windows is processed at a different sensitivity than a second processing window of the plurality of processing windows.

* * * * *